(12) United States Patent
Hamakawa (10) Patent No.: US 9,116,773 B2
(45) Date of Patent: Aug. 25, 2015

(54) INFORMATION PROCESSING APPARATUS, IMAGE FORMING APPARATUS, AND METHOD FOR CONTROLLING INFORMATION PROCESSING APPARATUS

(71) Applicant: KYOCERA DOCUMENT SOLUTIONS INC., Osaka (JP)

(72) Inventor: Takeshi Hamakawa, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 91 days.

(21) Appl. No.: 13/852,173

(22) Filed: Mar. 28, 2013

(65) Prior Publication Data
US 2013/0263107 A1    Oct. 3, 2013

(30) Foreign Application Priority Data

Mar. 30, 2012    (JP) .................... 2012-079121

(51) Int. Cl.
G06F 9/44        (2006.01)
G06F 9/445       (2006.01)

(52) U.S. Cl.
CPC ........................................ G06F 8/65 (2013.01)

(58) Field of Classification Search
None
See application file for complete search history.

(56) References Cited

U.S. PATENT DOCUMENTS

| 6,425,126 | B1 * | 7/2002 | Branson et al. ............... 717/168 |
| 7,080,372 | B1 * | 7/2006 | Cole ............................. 717/173 |
| 2004/0145766 | A1 * | 7/2004 | Sugishita et al. ............ 358/1.13 |
| 2007/0253723 | A1 | 11/2007 | Fujii et al. |
| 2008/0071942 | A1 * | 3/2008 | Takamoto et al. .............. 710/19 |
| 2008/0301629 | A1 * | 12/2008 | Stark ............................ 717/107 |
| 2009/0240791 | A1 * | 9/2009 | Sakurai et al. ................ 709/221 |
| 2011/0211888 | A1 | 9/2011 | Fujinaga |

FOREIGN PATENT DOCUMENTS

JP    2007-293702 A    11/2007
JP    2011-180196 A    9/2011

* cited by examiner

*Primary Examiner* — James D Rutten
(74) *Attorney, Agent, or Firm* — Morgan, Lewis & Bockius LLP (57) ABSTRACT

Provided is an information processing apparatus that allows program updating to be promptly completed. In the information processing apparatus, a memory of at least one of a plurality of devices or a storage portion stores program updating order information specifying an order for updating a program in each device group. Upon an acquisition portion acquiring update data, in accordance with an order of priority in each device group represented by the program updating order information, each of the plurality of devices classified into a plurality of device groups performs program updating with respect to itself.

6 Claims, 7 Drawing Sheets

| PROGRAM REWRITING | | COMPLETED |
|---|---|---|
| F — MAIN CONTROL PORTION | G — ▬▬▬▬ | COMPLETED |
| ENGINE CONTROL PORTION | G — ▬▬▬▬ | COMPLETED |
| F — PAPER FEED CONTROL PORTION | G — ▬▬▬▬ | COMPLETED |
| FINISH PROCESSING CONTROL PORTION | G — ▬▬▬▬ | COMPLETED |
| F — SCANNER CONTROL PORTION | G — ▬▬▬▬ | COMPLETED |
| ORIGINAL DOCUMENT CONVEYING CONTROL PORTION | G — ▬▬▬▬ | COMPLETED |
| F — PANEL CONTROL PORTION | G — ▬▬▬▬ | COMPLETED |

| PROGRAM REWRITING | | COMPLETED |
|---|---|---|
| MAIN CONTROL PORTION | V1.20 | COMPLETED |
| ENGINE CONTROL PORTION | V1.00 | — |
| PAPER FEED CONTROL PORTION | V1.30 | COMPLETED |
| FINISH PROCESSING CONTROL PORTION | V1.00 | COMPLETED |
| SCANNER CONTROL PORTION | V1.50 | — |
| ORIGINAL DOCUMENT CONVEYING CONTROL PORTION | V1.10 | COMPLETED |
| PANEL CONTROL PORTION | V1.10 | COMPLETED |

FIG.9

INFORMATION PROCESSING APPARATUS, IMAGE FORMING APPARATUS, AND METHOD FOR CONTROLLING INFORMATION PROCESSING APPARATUS

INCORPORATION BY REFERENCE

This application is based on and claims the benefit of priority from Japanese Patent Application No. 2012-079121 filed on Mar. 30, 2012, the contents of which are hereby incorporated by reference.

BACKGROUND

The present disclosure relates to an information processing apparatus, an image forming apparatus, and a method for controlling the information processing apparatus.

Conventionally, there is known an information processing apparatus that fulfills its functions by using a plurality of control portions (devices each including a CPU, a memory, and so on). Such an information processing apparatus is used for, for example, controlling a job execution portion of an image forming apparatus.

An image forming apparatus is composed of, for example, a main control portion that performs control of the entire apparatus, an engine control portion that controls a printing operation with respect to a paper sheet, and a scanner control portion that controls a scanning operation with respect to an original document. Each of the control portions of the image forming apparatus includes, for example, a CPU, a memory, and so on and stores a program for executing a job corresponding to the each of the control portions.

By the way, the image forming apparatus may be equipped with a multitude of optional devices such as a large-capacity paper feed device, a finish processing device that performs stapling processing, punching processing, and so on, and an original document conveying device that conveys an original document to a reading position for performing scanning. Typically, each of the optional devices includes a control portion that is composed of a CPU, a memory, and so on, and each of the control portions of the optional devices by itself retains a program for executing a job corresponding to the each of the control portions.

In the configuration described above, for example, the control portion of the paper feed device (hereinafter, referred to as a paper feed control portion) and the control portion of the finish processing device (hereinafter, referred to as a finish processing control portion) are connected to the engine control portion. Furthermore, the control portion of the original document conveying device (hereinafter, referred to as an original document conveying control portion) is connected to the scanner control portion. In this case, for example, the engine control portion acts as a supervisory control portion that, based on a command from the main control portion, provides a command to each of the paper feed control portion and the finish processing control portion, and each of the paper feed control portion and the finish processing control portion acts as a subordinate control portion that is subordinate to the engine control portion. Similarly, the scanner control portion acts as a supervisory control portion that, based on a command from the main control portion, provides a command to the original document conveying control portion, and the original document conveying control portion acts as a subordinate control portion that is supervised by the scanner control portion.

Upon undergoing bug fixing, addition of a function, or the like, each of the programs of the control portions of the image forming apparatus is updated from an old version to a new version. An update program for updating each of the programs of the control portions is sent to the image forming apparatus via a network or the like. Alternatively, there is also a case where a portable storage medium storing such an update program is provided to a user of the image forming apparatus.

Herein, in the conventional technique, in a case of updating the programs of the plurality of control portions of the image forming apparatus, in accordance with a predetermined updating order, the main control portion sequentially commands the plurality of control portions, one at a time, to perform program updating. In other words, the main control portion commands one of the control portions ranked higher in the updating order to perform program updating, and after completion of the program updating at the one of the control portions, commands another one of the control portions ranked lower in the updating order to perform program updating. The reason for this is that, for example, in a case where a supervisory control portion has a processing program for performing program updating with respect to each subordinate control portion linked to itself, if program updating with respect to the supervisory control portion (namely, updating of the processing program) is performed first, program updating with respect to the each subordinate control portion may become unable to be performed.

In this case, for example, if the number of control portions to be subjected to program updating is small, it does not take so much time to complete program updating with respect to all the control portions. In a case of an image forming apparatus equipped with a large number of optional devices, however, the number of control portions that possibly become control portions to be subjected to program updating is increased.

For example, in a case where there exist a large number of control portions to be subjected to program updating, if all the control portions are sequentially subjected, one at a time, to program updating, it takes a lot of time to complete program updating with respect to all the control portions, which is disadvantageous.

SUMMARY

The present disclosure has been made to solve the above-described problem and has as its object to provide an information processing apparatus that allows program updating to be promptly completed, an image forming apparatus, and a method for controlling the image processing device.

Means for Solving the Problem

In order to achieve the above-described object, an information processing apparatus of the present disclosure includes a plurality of devices, an acquisition portion, and a storage portion. The plurality of devices each have a memory in which a program is stored and are classified into a plurality of device groups. The acquisition portion acquires update data as a compilation of update programs for updating the respective programs of the plurality of devices. The storage portion stores data. The memory of at least one of the plurality of devices or the storage portion stores program updating order information specifying an order for updating the program in each of the device groups. Upon the acquisition portion acquiring the update data, in accordance with a program updating order in each of the device groups represented by the program updating order information, each of the plurality of devices classified into the plurality of device groups performs program updating with respect to itself.

DETAILED DESCRIPTION (Entire Configuration of Image Forming Apparatus)

Figure 1:
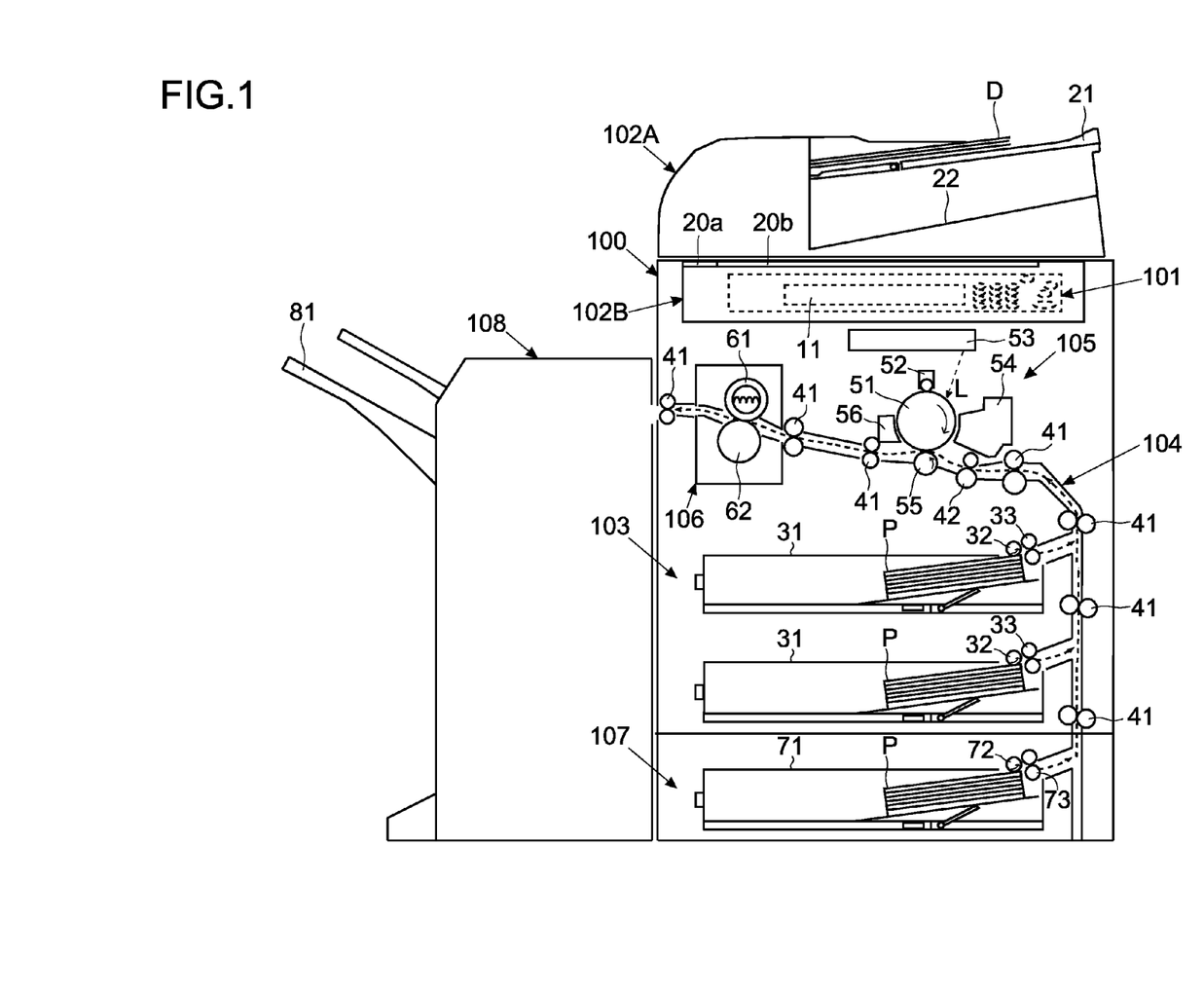
FIG. 1 is a schematic view of an image forming apparatus according to one embodiment of the present disclosure.

With reference to FIG. 1, the following describes an entire configuration of an image forming apparatus 100 according to one embodiment of the present disclosure.

The image forming apparatus 100 of this embodiment is a multifunctional peripheral and can execute a plurality of types of jobs such as copying, printing, scanning, and faxing. The image forming apparatus 100 includes an operation panel 101, an original document conveying portion 102A, an image reading portion 102B, a paper feed portion 103, a paper sheet conveying portion 104, an image forming portion 105, a fixing portion 106, an additional paper feed portion 107, a finish processing portion 108, and so on. There is also a case where a section including the paper feed portion 103, the paper sheet conveying portion 104, the image forming portion 105, and the fixing portion 106 is referred to as an engine section.

The operation panel 101 is disposed, for example, on an apparatus front side. The operation panel 101 has a liquid crystal display portion 11 having a display surface covered with a touch panel. On the liquid crystal display portion 11, set keys (soft keys) that accept an operation of inputting a set value are displayed, and a message indicating a state of the apparatus and so on are also displayed. Furthermore, the operation panel 101 is provided also with a numeric keypad that accepts an operation of inputting a numerical value and hard keys such as a start key, each of which accepts a command to execute a job.

The original document conveying portion 102A is mounted pivotably (openably and closably) about a rotary shaft (not shown) provided at a portion of the image reading portion 102B on an apparatus back side. The original document conveying portion 102A draws out an original document D set on an original document set tray 21 to feed it to an upper side of a contact glass 20a for conveyance reading and ejects it onto an original document ejection tray 22.

Furthermore, the original document conveying portion 102A also has a function of holding down the original document D placed on a contact glass 20b for placement reading. That is, when the original document conveying portion 102A is made to pivot upward, the contact glass 20b for placement reading is exposed, so that the original document D can be placed on the contact glass 20b for placement reading. After the original document D is placed on the contact glass 20b for placement reading, the original document conveying portion 102A is made to pivot downward, so that the original document D placed on the contact glass 20b for placement reading is held down by the original document conveying portion 102A.

The original document conveying portion 102A is mountable to and demountable from an apparatus main body and is, for example, an optional device (may be a device included as standard equipment). For example, in a case where the original document conveying portion 102A is demounted form the apparatus main body, in place of the original document conveying portion 102A, an original document cover that holds down the original document D placed on the contact glass 20b for placement reading can be mounted.

The image reading portion 102B reads the original document D and generates image data. In the image reading portion 102B, though not shown, optical system members such as an exposure lamp, a mirror, a lens, and an image sensor are provided. The image reading portion 102B irradiates with light the original document D passing over the contact glass 20a for conveyance reading or the original document D placed on the contact glass 20b for placement reading, and performs an A/D conversion of an output value outputted by the image sensor as a result of receiving reflected light from the original document D, thereby generating image data. This allows printing to be performed based on image data obtained by a reading operation (scanning operation) of reading the original document D by the image reading portion 102B. Furthermore, it is also possible to accumulate image data obtained by a scanning operation by the image reading portion 102B.

The paper feed portion 103 has a plurality of cassettes 31 for housing the paper sheet P therein and supplies the paper sheet P housed in any of the plurality of cassettes 31 to the paper sheet conveying portion 104. In the paper feed portion 103, there are provided a pick-up roller 32 that draws out the paper sheet P housed and a separation roller pair 33 for suppressing double feed of the paper sheet P.

The paper sheet conveying portion 104 conveys the paper sheet P within the apparatus. To be specific, by the paper sheet conveying portion 104, the paper sheet P supplied from the paper feed portion 103 is made to pass through the image forming portion 105 and the fixing portion 106 in this order. In the paper sheet conveying portion 104, a plurality of conveying roller pairs 41 for conveying the paper sheet P are provided. Moreover, there is also provided a registration roller pair 42 that puts the paper sheet P on standby in front of the image forming portion 105 and feeds it out to the image forming portion 105 in a well-timed manner.

The image forming portion 105 forms, based on image data, a toner image and transfers the toner image onto the paper sheet P. The image forming portion 105 includes a photosensitive drum 51, a charging device 52, an exposure device 53, a developing device 54, a transfer roller 55, a cleaning device 56, and so on.

A process for forming a toner image and a process for transferring a toner image are described below. First, the photosensitive drum 51 is driven to rotate so that a surface of the photosensitive drum 51 is charged to a prescribed potential by the charging device 52. Furthermore, the exposure device 53 outputs, based on image data, a light beam L with which it scans and exposes the surface of the photosensitive drum 51. Thereby, an electrostatic latent image is formed on the surface of the photosensitive drum 51. Subsequently, the developing device 54 supplies toner to the electrostatic latent image formed on the surface of the photosensitive drum 51 and thus develops the electrostatic latent image.

The transfer roller 55 is in pressure contact with the surface of the photosensitive drum 51. After this, the registration roller pair 42 forwards the paper sheet P in a well-timed manner into between the transfer roller 55 and the photosensitive drum 51. At this time, a prescribed voltage is applied to the transfer roller 55. Thereby, a toner image on the surface of the photosensitive drum 51 is transferred onto the paper sheet P. After completion of the process for transferring a toner image, the cleaning device 56 removes residual toner remaining on the surface of the photosensitive drum 51.

The fixing portion 106 applies heat and pressure to the toner image transferred onto the paper sheet P and thus fixes it. The fixing portion 106 includes a fixing roller 61 that incorporates therein a heat generation source and a pressing roller 62 that is brought into pressure contact with the fixing roller 61. The paper sheet P on which the toner image has been transferred passes between the fixing roller 61 and the pressing roller 62 and thus is heated and pressed. Thereby, the toner image is fixed to the paper sheet P, and thus a printing job is completed.

The additional paper feed portion 107 is mountable to and demountable from the apparatus main body and is, for example, an optional device (may be a device included as standard equipment). The additional paper feed portion 107 has substantially the same structure as that of the paper feed portion 103. That is, in the additional paper feed portion 107, there are provided a cassette 71 for housing the paper sheet P therein, a pick-up roller 72 that draws out the paper sheet P housed, a separation roller pair 73 for suppressing double feed of the paper sheet P, and so on. The additional paper feed portion 107 supplies the paper sheet P to the paper sheet conveying portion 104.

The finish processing portion 108 is mountable to and demountable from the apparatus main body and is, for example, an optional device (may be a device included as standard equipment). The paper sheet P after having been subjected to printing is conveyed from the fixing portion 106 to the finish processing portion 108. With respect to the paper sheet P after having been subjected to printing, the finish processing portion 108 performs finish processing such as, for example, sorting, stapling processing, and punching processing. After this, the finish processing portion 108 ejects the paper sheet P after having been subjected to such finish processing onto an ejection tray 81.

(Hardware Configuration of Image Forming Apparatus)

Figure 2:
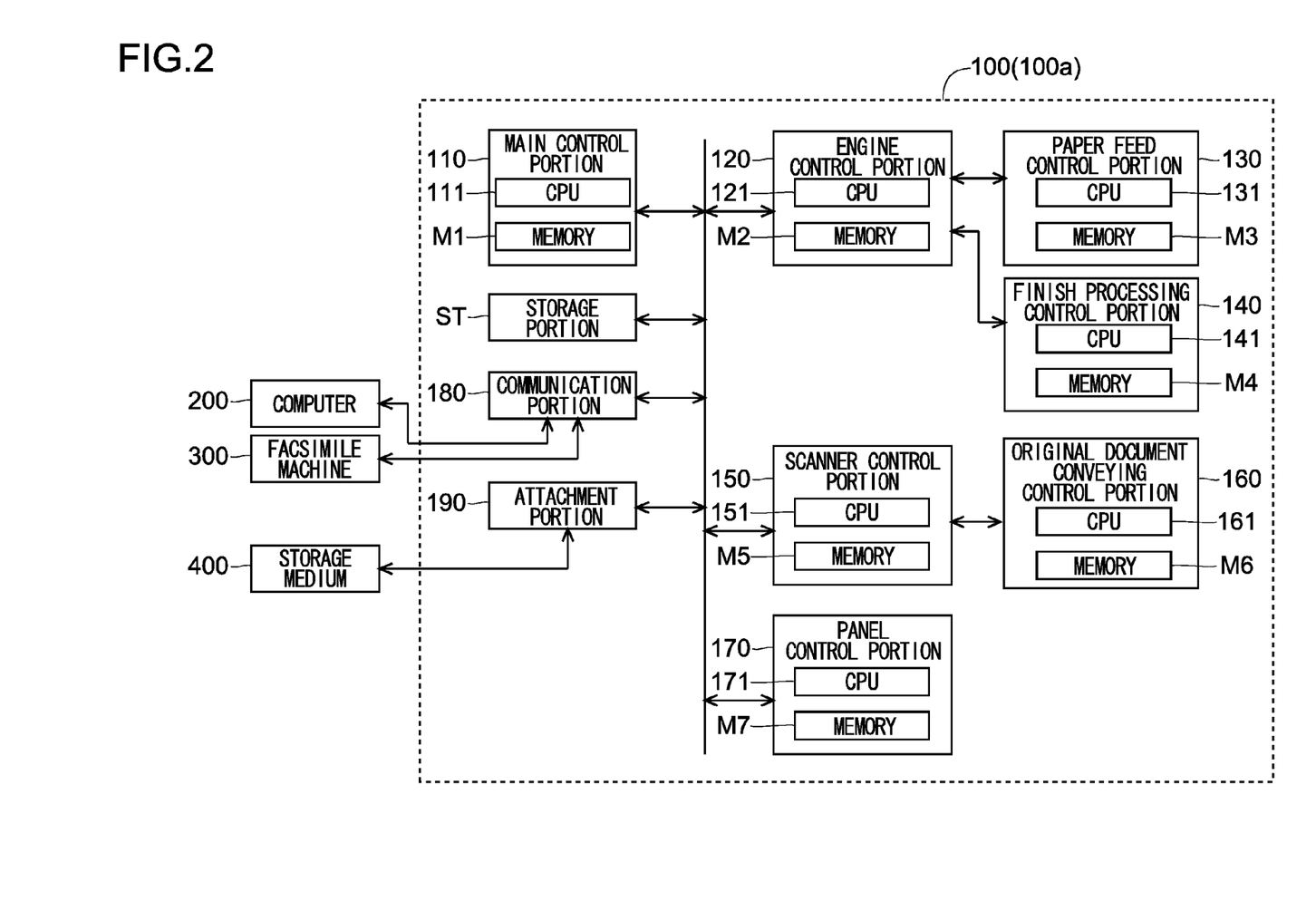
FIG. 2 is a view showing a hardware configuration of the image forming apparatus (information processing apparatus) shown in FIG. 1.

Next, with reference to FIG. 2, a description is given of a hardware configuration of the image forming apparatus 100.

The image forming apparatus 100 includes a main control portion 110 (corresponding to a device and to a main device). The main control portion 110 includes a CPU 111 that is a central processing unit, a memory M1, and so on. The memory M1 is, for example, a non-volatile memory (for example, a ROM) and stores a program for operating the CPU 111. Based on the program stored in the memory M1, the main control portion 110 (CPU 111) performs overall control, image processing control, and so on.

Furthermore, the main control portion 110 is connected to an engine control portion 120 (corresponding to a device and to a supervisory device). The engine control portion 120 includes a CPU 121, a memory M2 (for example, a ROM), and so on. The memory M2 stores a program for controlling an image forming operation of the engine section (the paper feed portion 103, the paper sheet conveying portion 104, the image forming portion 105, and the fixing portion 106). Upon receiving a command from the main control portion 110, based on the program stored in the memory M2, the engine control portion 120 controls the image forming operation of the engine section.

A paper feed control portion 130 (corresponding to a device and to a subordinate device) is connected to the engine control portion 120. The paper feed control portion 130 includes a CPU 131, a memory M3 (for example, a ROM), and so on. The memory M3 stores a program for controlling a paper feed operation of the additional paper feed portion 107. A command from the main control portion 110 is transmitted to the paper feed control portion 130 via the engine control portion 120 (the engine control portion 120 provides a command to the paper feed control portion 130). Thus, it can be said that the engine control portion 120 is a supervisory device that supervises the paper feed control portion 130 (it can be said that the paper feed control portion 130 is a subordinate device). That is, the engine control portion 120 and the paper feed control portion 130 are mutually in a supervisory-subordinate relationship, and the paper feed control portion 130 operates in subordination to the engine control portion 120.

A finish processing control portion 140 (corresponding to a device and to a subordinate device) further is connected to the engine control portion 120. The finish processing control portion 140 includes a CPU 141, a memory M4 (for example, a ROM), and so on. The memory M4 stores a program for controlling a finish processing operation of the finish processing portion 108. A command from the main control portion 110 is transmitted to the finish processing control portion 140 via the engine control portion 120 (the engine control portion 120 provides a command to the finish processing control portion 140). It, therefore, follows that the engine control portion 120 as the supervisory device supervises, in addition to the paper feed control portion 130, the finish processing control portion 140 as well (it can be said that the finish processing control portion 140 is a subordinate device). That is, the engine control portion 120 and the finish processing control portion 140 are mutually in a supervisory-subordinate relationship, and the finish processing control portion 140 operates in subordination to the engine control portion 120.

Furthermore, the main control portion 110 is connected to a scanner control portion 150 (corresponding to a device and to a supervisory device). The scanner control portion 150 includes a CPU 151, a memory M5 (for example, a ROM), and so on. The memory M5 stores a program for controlling a scanning operation of the image reading portion 102B. Upon receiving a command from the main control portion 110, based on the program stored in the memory M5, the scanner control portion 150 controls the scanning operation of the image reading portion 102B.

An original document conveying control portion 160 (corresponding to a device and to a subordinate device) is connected to the scanner control portion 150. The original document conveying control portion 160 includes a CPU 161, a memory M6 (for example, a ROM), and so on. The memory M6 stores a program for controlling an original document conveying operation of the original document control portion 102A. A command from the main control portion 110 is transmitted to the original document conveying control portion 160 via the scanner control portion 150 (the scanner control portion 150 provides a command to the original document conveying control portion 160). Thus, it can be said that the scanner control portion 150 is a supervisory device that supervises the original document conveying control portion 160 (it can be said that the original document conveying control portion 160 is a subordinate device). That is, the scanner control portion 150 and the original document conveying control portion 160 are mutually in a supervisory-subordinate relationship, and the original document conveying control portion 160 operates in subordination to the scanner control portion 150.

Furthermore, the main control portion 110 is connected to a panel control portion 170 (corresponding to a device, to a supervisory device, and to a device for display). The panel control portion 170 includes a CPU 171, a memory M7 (for example, a ROM), and so on. The memory M7 stores a program for controlling a display operation of the operation panel 101. Upon receiving a command from the main control portion 110, based on the program stored in the memory M7, the panel control portion 170 controls the display operation of the operation panel 101.

Herein, through communication with each of the engine control portion 120, the scanner control portion 150, and the panel control portion 170, the main control portion 110 receives a signal indicating whether or not any optional device is linked to the each of the engine control portion 120, the scanner control portion 150, and the panel control portion 170 (whether or not the apparatus main body is equipped with any optional device). For example, in an example shown in FIG. 2, based on a signal from the engine control portion 120, the main control portion 110 recognizes that the apparatus main body is equipped with, as optional devices, the additional paper feed portion 107 (paper feed control portion 130) and the finish processing portion 108 (finish processing control portion 140). Furthermore, based on a signal from the scanner control portion 150, the main control portion 110 recognizes that the apparatus main body is equipped with, as an optional device, the original document conveying portion 102A (original document conveying control portion 160).

Furthermore, the main control portion 110 is connected to a storage portion ST. The storage portion ST is constituted by, for example, a combination of a non-volatile storage portion and a volatile storage portion such as from among a ROM, a RAM, and a HDD and stores programs and data of various types.

Furthermore, the main control portion 110 is connected to a communication portion 180. The communication portion 180 is, for example, connected in a communicable manner to an external computer 200 via a network. This allows printing to be performed based on image data sent from the computer 200 and also allows image data obtained by the scanning operation of the image reading portion 102B to be sent to the computer 200. Furthermore, a modem or the like may be incorporated in the communication portion 180, in which case, via a network such as a telephone line, facsimile communication with an external facsimile machine 300 is enabled.

Furthermore, the main control portion 110 is connected to an attachment portion 190 to which a storage medium 400 such as a USB memory can be attached. This allows printing to be performed based on image data stored in the storage medium 400. Alternatively, it is also possible to accumulate, in the storage medium 400, image data obtained by the scanning operation of the image reading portion 102B.

In this embodiment, a device corresponding to an information processing apparatus is an information processing apparatus 100a including the main control portion 110, the engine control portion 120, the paper feed control portion 130, the finish processing control portion 140, the scanner control portion 150, the original document conveying control portion 160, the panel control portion 170, the communication portion 180, the attachment portion 190, and the storage portion ST.

(Method for Updating Program)

Upon undergoing bug fixing, addition of a function, or the like, each of the programs stored in the memories M1 to M7 of the main control portion 110 and control portions directly or indirectly connected in a communicable manner to the main control portion 110, i.e. the engine control portion 120, the paper feed control portion 130, the finish processing control portion 140, the scanner control portion 150, the original document conveying control portion 160, and the panel control portion 170 is updated from an old version to a new version.

An update data containing an update program for updating from an old version to a new version may be stored in the computer 200 connected to the image forming apparatus 100 via a network. In this case, the communication portion 180 functions as an acquisition portion that acquires update data, and the communication portion 180 as the acquisition portion acquires update data from the computer 200 via the network. Alternatively, there is also a case where update data is stored in the storage medium 400. In this case, the attachment portion 190 functions as an acquisition portion, and with the storage medium 400 attached to the attachment portion 190 as the acquisition portion, the attachment portion 190 acquires update data from the storage medium 400.

For example, it is assumed that either the communication portion 180 or the attachment portion 190 has acquired update data as a compilation of update programs for updating the programs stored, respectively, in the memories M1 to M7 of the main control portion 110, the engine control portion 120, the paper feed control portion 130, the finish processing control portion 140, the scanner control portion 150, the original document conveying control portion 160, and the panel control portion 170. In the following description, each of the control portions, i.e. the main control portion 110, the engine control portion 120, the paper feed control portion 130, the finish processing control portion 140, the scanner control portion 150, the original document conveying control portion 160, and the panel control portion 170 may be referred to simply as a device. Furthermore, each of the engine control portion 120, the scanner control portion 150, and the panel control portion 170 may be referred to as a supervisory device, and each of the paper feed control portion 130, the finish processing control portion 140, and the original document conveying control portion 160 may be referred to as a subordinate device.

Upon either the communication portion 180 or the attachment portion 190 acquiring update data, the main control portion 110 recognizes a device(s) to be subjected to program updating. Herein, devices to be subjected to program updating are the main control portion 110, the engine control portion 120, the paper feed control portion 130, the finish processing control portion 140, the scanner control portion 150, the original document conveying control portion 160, and the panel control portion 170.

Herein, the main control portion 110 classifies a plurality of devices into a plurality of device groups so that a supervisory device and a subordinate device(s) mutually in a supervisory-subordinate relationship constitute a common group.

That is, the main control portion 110 classifies devices unable to be subjected to program updating at the same time in a common group (classifies a supervisory device and a subordinate device(s) linked to the supervisory device in a common group). In other words, among the plurality of device groups, program updating can be performed in parallel.

Figure 3:
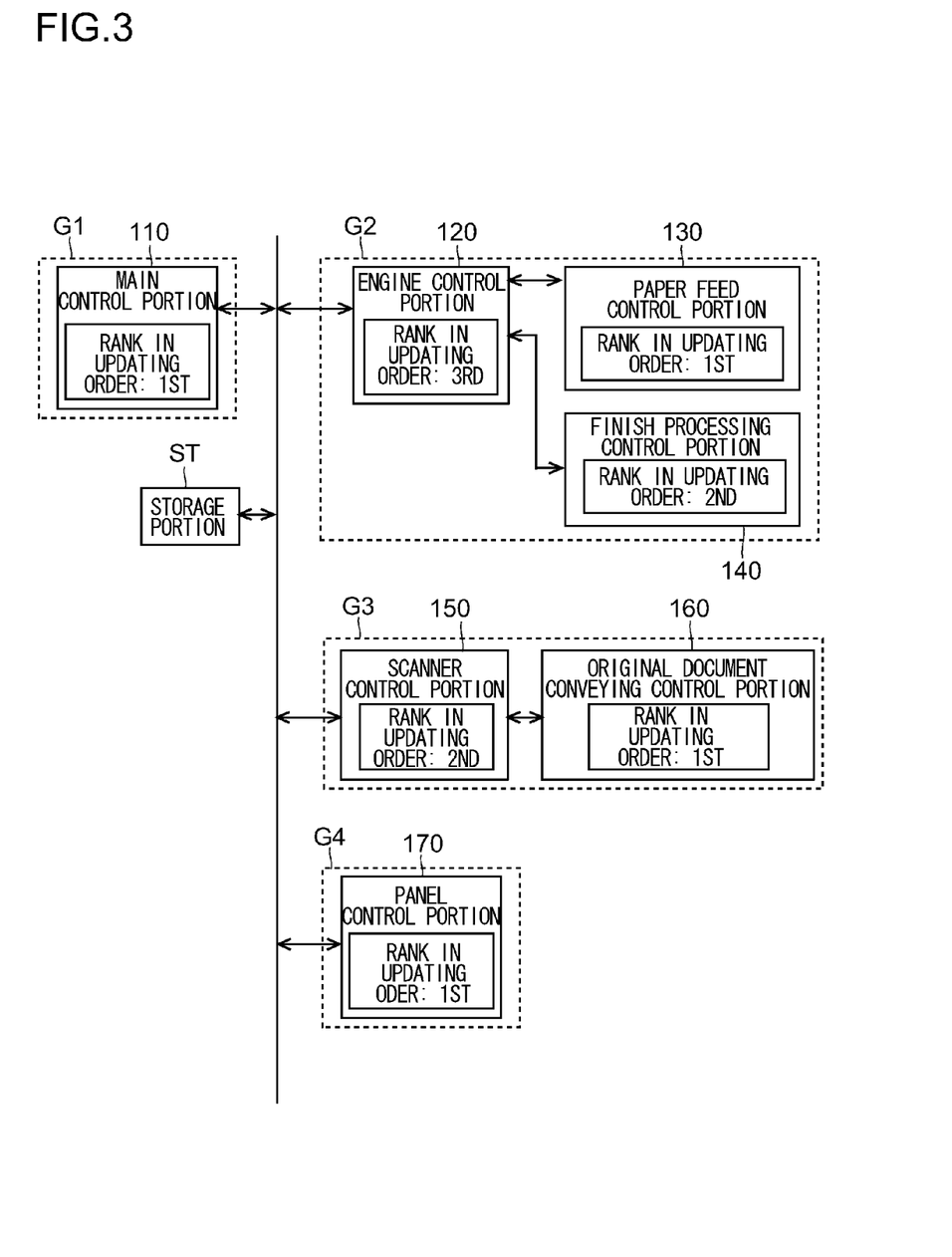
FIG. 3 is a view for explaining how a plurality of devices included in the image forming apparatus (information processing apparatus) shown in FIG. 1 are divided into groups.

To be specific, as shown in FIG. 3, the main control portion 110 classifies itself in a device group G1. Furthermore, the main control portion 110 classifies the engine control portion 120, the paper feed control portion 130, and the finish processing control portion 140 in a common device group G2. Furthermore, the main control portion 110 classifies the scanner control portion 150 and the original document conveying control portion 160 in a common device group G3. Furthermore, the main control portion 110 classifies the panel control portion 170, to which no subordinate device is subordinately linked, in a device group G4. The processing of classifying the plurality of devices into the plurality of device groups G1 to G4 is performed at the time of, for example, start-up of the apparatus, mounting/demounting of an optional device(s) (the original document conveying portion 102A, the additional paper feed portion 107, and the finish processing portion 108) with respect to the apparatus main body, or program updating.

Furthermore, in the storage portion ST, program updating order information specifying an order for updating a program in each device group (information specifying, in each device group, a level of priority assigned to each device in determining an order to be followed in program updating) is stored. Alternatively, the program updating order information may be stored in at least one of the memories M1 to M7 (see FIG. 2). Based on the program updating order information, the main control portion 110 determines, in each device group, a level of priority assigned to each device in determining an order to be followed in program updating.

Then, the main control portion 110 commands each of the engine control portion 120, the scanner control portion 150, and the panel control portion 170 to start program updating in the program updating order thus determined. Thus, in accordance with the program updating order determined by the main control portion 110, each of the engine control portion 120, the scanner control portion 150, and the panel control portion 170 operates a subordinate device(s) thereof to perform program updating, or performs program updating with respect to itself. Furthermore, the main control portion 110 also performs program updating with respect to itself. That is, in accordance with a program updating order in each device group represented by program updating order information, each of the plurality of devices classified into the plurality of device groups G1 to G4 performs program updating with respect to itself.

(Flow of Program Updating)

Figure 4:
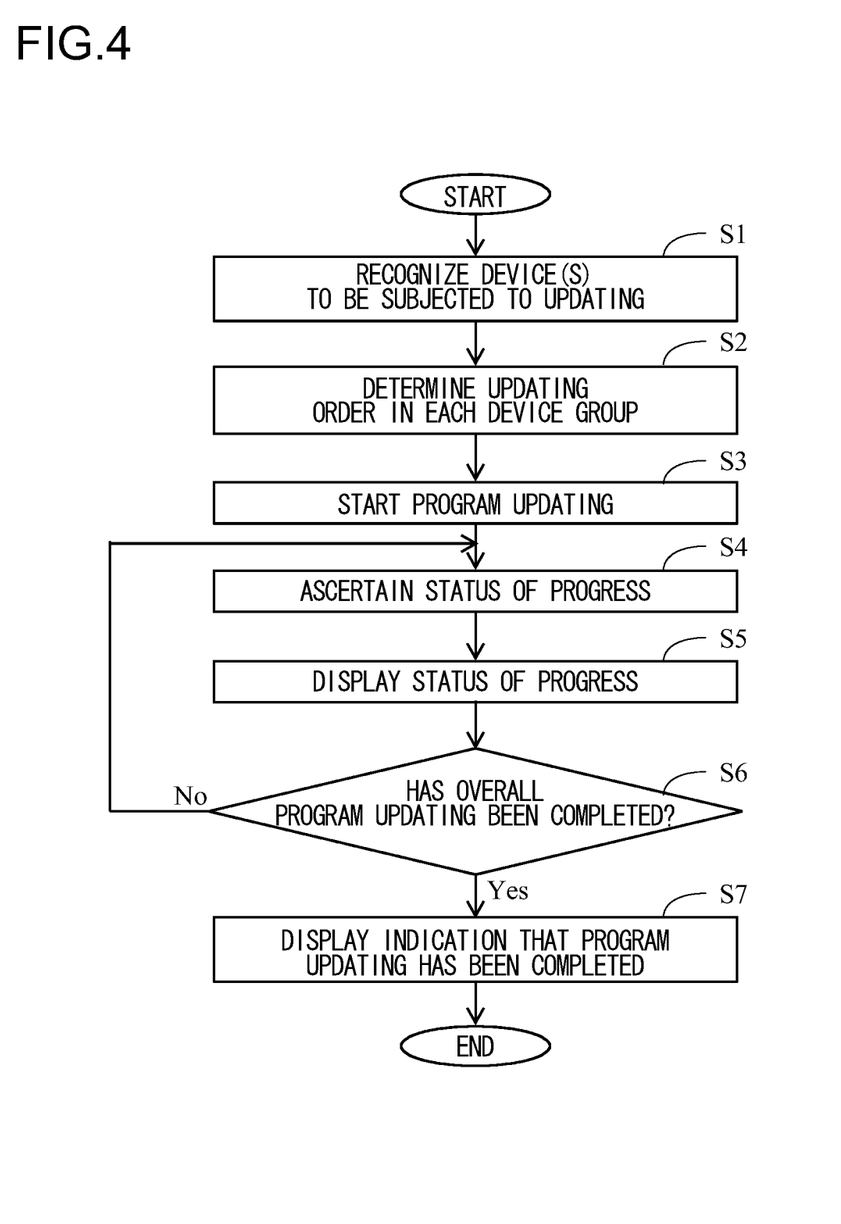
FIG. 4 is a view for explaining an operation of updating a program in the image forming apparatus shown in FIG. 1.

Next, with reference to FIG. 4, a description is given of an operation of the main control portion 110 in updating a program.

First, a flow of FIG. 4 shows a case where the communication portion 180 (or the attachment portion 190) has acquired update data as a compilation of update programs for updating the respective programs of the plurality of devices. The following description assumes that, for example, the communication portion 180 (or the attachment portion 190) has acquired update data as a compilation of update programs for updating the programs stored, respectively, in the memories M1 to M7 of the main control portion 110, the engine control portion 120, the paper feed control portion 130, the finish processing control portion 140, the scanner control portion 150, the original document conveying control portion 160, and the panel control portion 170.

At Step S1, the main control portion 110 recognizes a device(s) to be subjected to program updating. Herein, the main control portion 110 recognizes that all the devices (the main control portion 110, the engine control portion 120, the paper feed control portion 130, the finish processing control portion 140, the scanner control portion 150, the original document conveying control portion 160, and the panel control portion 170) are to be subjected to program updating.

At Step S2, based on program updating order information, the main control portion 110 determines an order for updating a program in each device group. For example, in the device group G2, as shown in FIG. 3, an updating order of the paper feed control portion 130 (first), then the finish processing control portion 140 (second), and then the engine control portion 120 (third) is followed. Supposing that the finish processing control portion 140 is not to be subjected to program updating, a program updating order of the paper feed control portion 130 (first) and then the engine control portion 120 (second) is followed. Furthermore, when only the engine control portion 120 is to be subjected to program updating, a program updating order in which the engine control portion 120 is ranked highest is followed.

At Step S3, the main control portion 110 commands each of the engine control portion 120, the scanner control portion 150, and the panel control portion 170 to start program updating in the program updating order thus determined. Furthermore, the main control portion 110 also performs program updating with respect to itself.

At Step S4, the main control portion 110 ascertains a status of progress of the program updating in each of the device groups G1 to G4. In ascertaining a status of progress of the program updating in each of the device groups G1 to G4, the main control portion 110 receives, from each of the engine control portion 120, the scanner control portion 150, and the panel control portion 170, data indicating a status of progress of the program updating (data indicating an amount of data that has been updated) and ascertains the status of progress of the program updating in terms of a rate (%). At Step S5, the main control portion 110 provides a command to the panel control portion 170 so that information indicating the status of progress of the program updating in each of the device groups G1 to G4 is displayed on the operation panel 101 (liquid crystal display portion 11).

Figure 5:
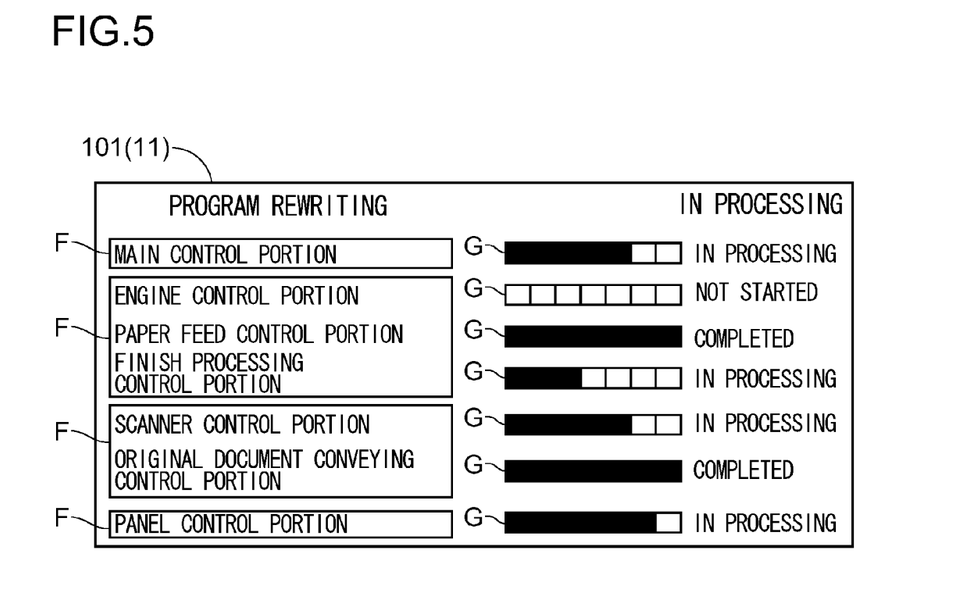
FIG. 5 is a view showing as one example a screen displayed on a display portion of the image forming apparatus shown in FIG. 1.
Figure 6:
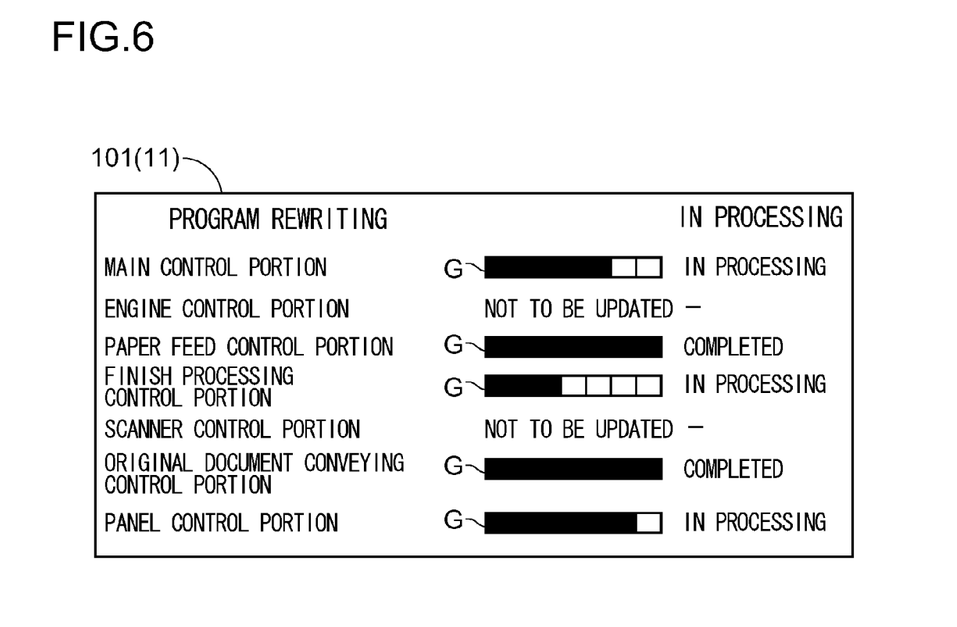
FIG. 6 is a view showing as one example a screen displayed on the display portion of the image forming apparatus shown in FIG. 1.

At this time, for example, as shown in FIG. 5, at a position corresponding to a name display box for each of the devices (the main control portion 110, the engine control portion 120, the paper feed control portion 130, the finish processing control portion 140, the scanner control portion 150, the original document conveying control portion 160, and the panel control portion 170), the operation panel 101 displays a gage G (columnar graph) indicating a rate of progress of the program updating. The main control portion 110 operates the operation panel 101 to update a display of the gage G depending on a status of progress of the program updating. Alternatively, at the position corresponding to the name display box for each of the devices, any one of messages "Not Started", "In Processing", and "Completed" may be displayed. Moreover, in order to identify a device(s) belonging to each of the device groups G1 to G4, a name display box(es) corresponding to each device group may be enclosed in a frame F. Furthermore, supposing that there exists any device(s) not to be subjected to program updating (assumed to be, for example, the engine control portion 120 and the scanner control portion 150), as shown in FIG. 6, at a position corresponding to the name display box for each of the device(s) not to be subjected to program updating, in place of the gage G, information indicating that a device is not to be subjected to program updating (for example, a message "Not to be Updated") may be displayed.

Referring back to FIG. 4, at Step S6, the main control portion 110 judges whether or not the program updating in all the device groups G1 to G4 has been completed. If, as a result of the judgment, it is judged that such overall program updating has been completed, a transition is made to Step S7. On the other hand, if it is judged that such overall program updating has not yet been completed, a transition is made to Step S4.

Upon the transition to Step S7, the main control portion 110 provides a command to the panel control portion 170 so that information indicating that the program updating in all the device groups G1 to G4 has been completed is displayed on the operation panel 101 (liquid crystal display portion 11).

Figure 7:
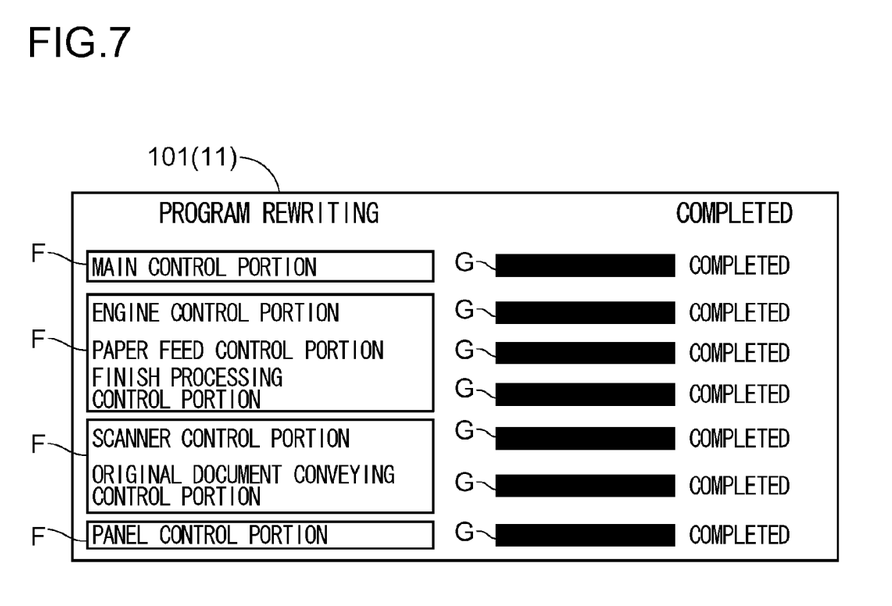
FIG. 7 is a view showing as one example a screen displayed on the display portion of the image forming apparatus shown in FIG. 1.
Figure 8:
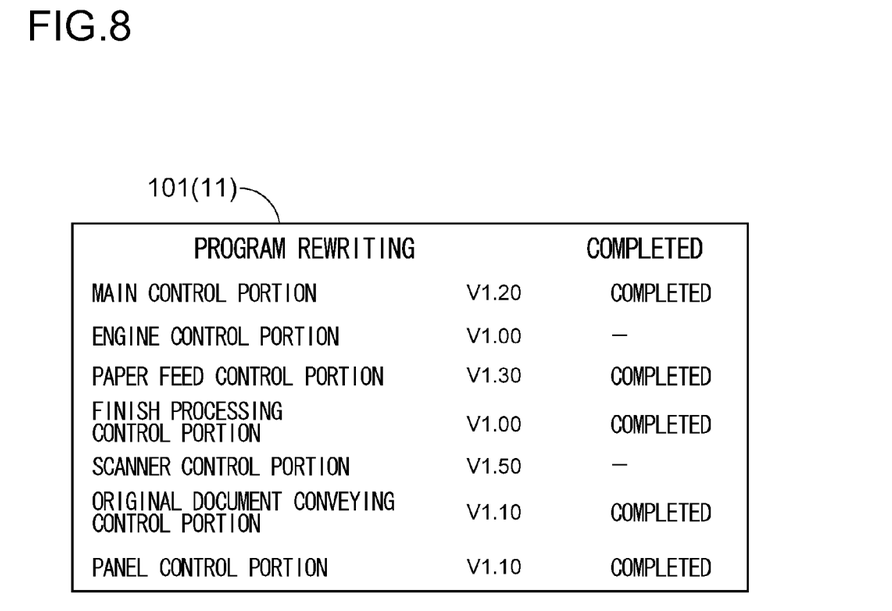
FIG. 8 is a view showing as one example a screen displayed on the display portion of the image forming apparatus shown in FIG. 1.

At this time, for example, as shown in FIG. 7, the operation panel 101 performs a display such that the gage G displayed at the position corresponding to the name display box for each of the devices (the main control portion 110, the engine control portion 120, the paper feed control portion 130, the finish processing control portion 140, the scanner control portion 150, the original document conveying control portion 160, and the panel control portion 170) has a maximum length. Alternatively, at the position corresponding to the name display box for each of the devices, a message "Completed" may be displayed. Furthermore, as shown in FIG. 8, at the position corresponding to the name display box for each of the devices, in place of the gage G, a version of a program after program updating may be displayed.

Figure 9:
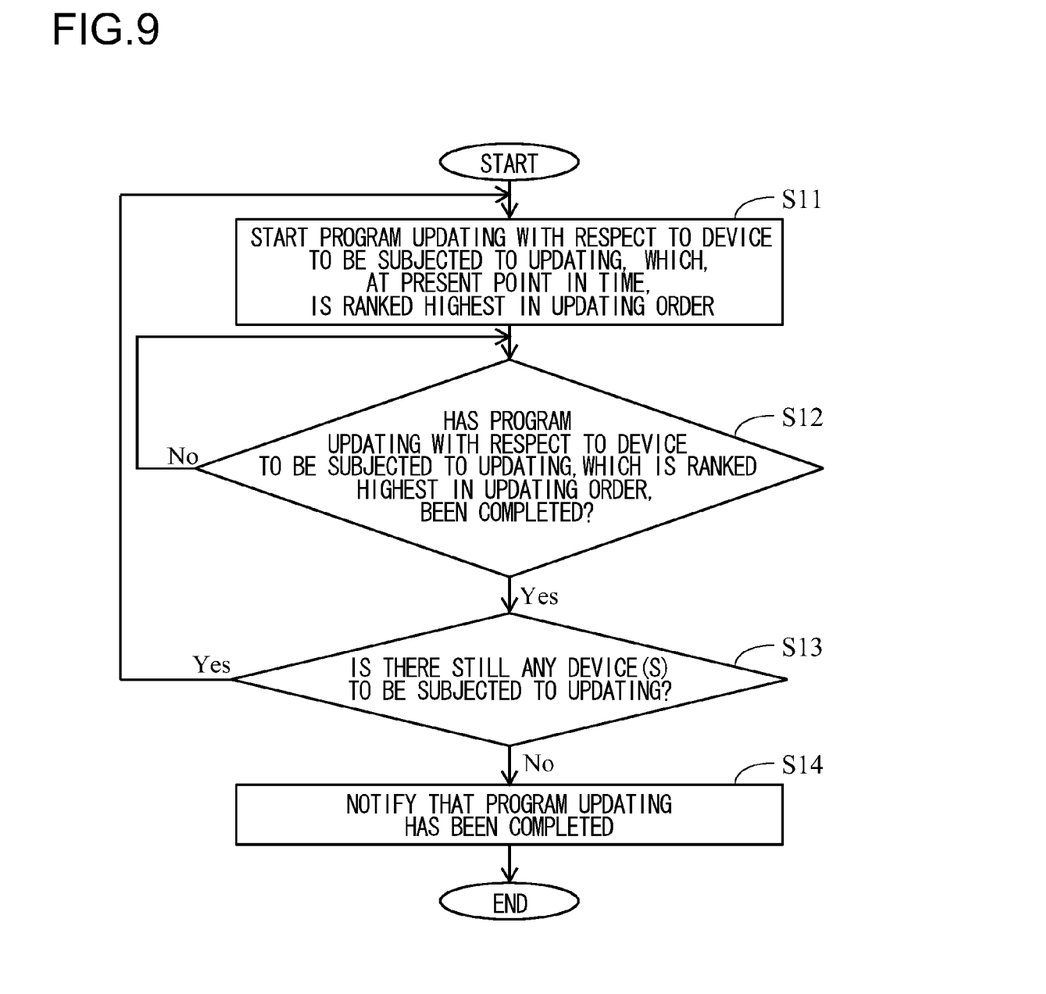
FIG. 9 is a view for explaining an operation of updating a program in the image forming apparatus shown in FIG. 1.

Next, with reference to FIG. 9, a description is give of an operation of each of supervisory devices (the engine control portion 120, the scanner control portion 150, and the panel control portion 170) in updating a program.

First, a flow of FIG. 9 starts at the time when, at Step S3 in the flow of FIG. 4, the main control portion 110 commands each of the engine control portion 120, the scanner control portion 150, and the panel control portion 170 to start program updating. While the following describes, as one example, an operation of the engine control portion 120 performed when the engine control portion 120 has received a command to start program updating from the main control portion 110, the scanner control portion 150 and the panel control portion 170 also perform the same operation as that of the engine control portion 120. The engine control portion 120 belongs to the device group G2, and in the device group G2, as shown in FIG. 3, the program updating order of the paper feed control portion 130 (first), then the finish processing control portion 140 (second), and then the engine control portion 120 (third) is followed.

At Step S11, the engine control portion 120 starts program updating with respect to, one of devices to be subjected to program updating belonging to the device group G2, which, at the present point in time, is ranked highest in a program updating order. For example, at a starting point in time, as the devices to be subjected to program updating, there exist the engine control portion 120, the paper feed control portion 130, and the finish processing control portion 140 (these have not yet been subjected to program updating, thus remaining to be subjected to program updating). In this case, the engine control portion 120 commands the paper feed control portion 130, which is ranked first in the program updating order, to start program updating.

At Step S12, the engine control portion 120 judges whether or not the program updating started at Step S11 has been completed. If, as a result of the judgment, it is judged that the program updating has been completed, a transition is made to Step S13. On the other hand, if the program updating has not yet been completed, the judgment at Step S12 is repeatedly performed.

Upon the transition to Step S13, the engine control portion 120 judges whether or not there exists any device(s) to be subjected to program updating in the device group G2 (judges whether or not there exists any device(s) that has not yet been subjected to program updating, thus remaining to be subjected to program updating). If, as a result of the judgment, it is judged that there exists any device(s) to be subjected to program updating, a transition is made to Step S11.

For example, when the program updating with respect to the paper feed control portion 130 has been completed, the paper feed control portion 130 is no longer to be subjected to program updating. This means that the engine control portion 120 and the finish processing control portion 140 remain to be subjected to program updating, and thus a transition is made to Step S11.

Then, at Step S11, since of the engine control portion 120 and the finish processing control portion 140, the finish processing control portion 140 is a device to be subjected to program updating that, at the present point in time, is ranked highest in the program updating order, the engine control portion 120 commands the finish processing control portion 140 to start program updating. When the program updating with respect to the finish processing control portion 140 has been completed, a transition is made to Step S13 from Step S12. At this point in time, the engine control portion 120 still remains to be subjected to program updating. Thus, a transition is made to Step S11, where the engine control portion 120 starts program updating with respect to itself, which, at the present point in time, is ranked highest in the program updating order. When the engine control portion 120 has completed the program updating with respect to itself, a transition is made to Step S13 from Step S12.

If, at Step S13, as a result of judging whether or not there exists any device(s) to be subjected to program updating in the device group G2, it is judged that there exists no device to be subjected to program updating, a transition is made to Step S4. That is, if it is judged that program updating with respect to all the devices (the engine control portion 120, the paper feed control portion 130, and the finish processing control portion 140) that were to be subjected to program updating in the device group G2 has been completed, a transition is made to Step S14. At Step S14, the engine control portion 120 communicates with the main control portion 110 to notify the main control portion 110 that program updating with respect to all the devices that were to be subjected to program updating in the device group G2 has been completed.

In this embodiment, as described above, the main control portion 110 (device), the engine control portion 120 (device), the paper feed control portion 130 (device), the finish processing control portion 140 (device), the scanner control portion 150 (device), the original document conveying control portion 160 (device), and the panel control portion 170 (device) are classified into the plurality of device groups G1 to G4. Furthermore, at least one of the memories M1 to M7 or the storage portion ST stores program updating order information specifying an order for updating a program in each device group. Upon the communication portion 180 (acquisition portion) or the attachment portion 190 (acquisition portion) acquiring update data, in accordance with a program updating order in each device group represented by program updating order information, each of the plurality of devices classified into the plurality of device groups G1 to G4 performs program updating with respect to itself. Thus, program updating with respect to each of the plurality of devices classified into the plurality of device groups G1 to G4 is performed in parallel among the plurality of device groups G1 to G4. In other words, program updating with respect to two or more devices belonging to different device groups from each other is performed at the same time. As a result, even if there exist a large number of devices to be subjected to program updating, updating of a program can be promptly completed.

Furthermore, in this embodiment, as described above, through communication with the engine control portion 120 (supervisory device), the scanner control portion 150 (supervisory device), and the panel control portion 170 (supervisory device), the main control portion 110 (main device) recognizes the paper feed control portion 130 (subordinate device), the finish processing control portion 140 (subordinate device), and the original document conveying control portion 160 (subordinate device), each of which is subordinately linked to a supervisory device, and classifies the plurality of devices into the plurality of device groups G1 to G4 so that a supervisory device and a subordinate device(s) mutually in a supervisory-subordinate relationship constitute a common group. For example, a supervisory device has a processing program for processing program updating with respect to each subordinate device linked to itself. In this case, if program updating with respect to the supervisory device (namely, updating of the processing program) is performed first, program updating with respect to the each subordinate device may become unable to be performed. Thus, in order that program updating with respect to the each subordinate device and program updating with respect to the supervisory device can be performed in this order, preferably, the supervisory device and the each subordinate device mutually in a supervisory-subordinate relationship are included in a common device group.

Furthermore, in this embodiment, as described above, the panel control portion 170 (device for display) operates so that information indicating a status of progress in program updating is displayed on the operation panel 101 (display portion) and so that, at completion of program updating, information indicating that the program updating has been completed is displayed on the operation panel 101. This configuration allows a user (or a serviceman) to easily check whether or not program updating is being performed without trouble, thus enhancing convenience.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An information processing apparatus, comprising:
a plurality of devices that each have a memory in which a program is stored and are classified into a plurality of device groups;
an acquisition device configured to acquire update data as a compilation of update programs for updating the respective programs of the plurality of devices; and
a storage device configured to store data,
wherein:
the plurality of devices comprises a main device that performs control of the entire apparatus,
through communication with a supervisory device other than the main device, the main device recognizes a subordinate device, which is subordinately linked to the supervisory device, and classifies the plurality of devices into the plurality of device groups so that the supervisory device and the subordinate device which are mutually in a supervisory-subordinate relationship and for which program updating cannot be performed simultaneously constitute a common group,
the memory of at least one of the plurality of devices or the storage device stores program updating order information specifying an order for updating the program in each of the device groups such that program updating with respect to the subordinate device and program updating with respect to the supervisory device are performed in this order,
upon the acquisition device acquiring the update data, in accordance with a program updating order in each of the device groups represented by the program updating order information, each of the plurality of devices classified into the plurality of device groups performs program updating with respect to itself, and
program updating performed independently among the plurality of device groups is performed concurrently among the plurality of device groups.

2. The information processing apparatus according to claim 1, wherein the main device classifies the plurality of devices into the plurality of device groups so that the main device, alone, constitutes one group.

3. The information processing apparatus according to claim 1, wherein:
a display portion that displays information is provided,
one of the plurality of devices is a device for display for displaying information on the display portion, and
the device for display operates so that:
names of the plurality of devices are displayed on the display portion;
at respective positions corresponding to name display boxes for the plurality of devices, information indicating a status of progress in program updating on the devices having the names displayed in the corresponding name display boxes is displayed on the display portion; and
at completion of program updating, information indicating that the program updating has been completed is displayed on the display portion.

4. The information processing apparatus according to claim 3, wherein the display portion encloses the name display boxes for the plurality of devices in a frame for each device group.

5. The information processing apparatus according to claim 3, wherein, if a device that is not a target of program updating is present among the plurality of devices, the display portion also displays a name of the device that is not a target of program updating, and displays information indicating that the device that is not a target of program updating is not a target of program updating.

6. An image forming apparatus comprising the information processing apparatus according to claim 1.

* * * * *